(12) United States Patent
Adams

(10) Patent No.: US 9,228,807 B1
(45) Date of Patent: Jan. 5, 2016

(54) ANTI-SHIP CRUISE MISSILE BARRIER

(71) Applicant: Lockheed Martin Corporation, Bethesda, MD (US)

(72) Inventor: Kenneth M. Adams, Delanco, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 382 days.

(21) Appl. No.: 13/763,954

(22) Filed: Feb. 11, 2013

(51) Int. Cl.
*F41H 11/04* (2006.01)
*B64B 1/44* (2006.01)
*G05D 1/00* (2006.01)

(52) U.S. Cl.
CPC *F41H 11/04* (2013.01); *B64B 1/44* (2013.01); *G05D 1/0011* (2013.01)

(58) Field of Classification Search
CPC ......... F41H 11/00; F41H 11/02; F41H 11/04; F41H 11/05; B64D 1/44; G05D 1/0011
USPC ........................................................ 89/36.16
See application file for complete search history.

(56) References Cited

U.S. PATENT DOCUMENTS

| | | | | |
|---|---|---|---|---|
| 1,014,719 | A * | 1/1912 | Pennock | 307/149 |
| 1,712,164 | A * | 5/1929 | Peppin | 89/36.16 |
| 1,731,091 | A * | 10/1929 | Belleville | 244/110 F |
| 2,170,481 | A | 8/1939 | Morrison | |
| 2,293,918 | A * | 8/1942 | Planiol | 361/220 |
| 2,345,550 | A * | 4/1944 | Berman | 89/1.11 |
| 2,378,563 | A * | 6/1945 | Lakatos, Jr. | 89/36.16 |
| 4,077,588 | A * | 3/1978 | Hurst | 244/31 |
| 4,753,400 | A * | 6/1988 | Reuter et al. | 244/110 R |
| 6,575,403 | B1 * | 6/2003 | Monroe | 244/31 |
| 6,588,702 | B2 * | 7/2003 | Robbins | 244/31 |
| 7,152,517 | B1 | 12/2006 | Ivey | |
| 7,201,348 | B1 * | 4/2007 | Flammer | 244/110 C |
| 7,866,101 | B2 | 1/2011 | Boggs, Jr. | |
| 8,122,810 | B2 * | 2/2012 | Glasson | 89/1.11 |
| 8,399,816 | B2 * | 3/2013 | Glasson | 244/3.1 |
| 2004/0177799 | A1 * | 9/2004 | Andersson et al. | 114/382 |
| 2005/0230187 | A1 * | 10/2005 | Bradley | 182/138 |
| 2006/0037721 | A1 * | 2/2006 | Zahner | A47H 13/02 160/330 |
| 2006/0248827 | A1 | 11/2006 | Meeker | |
| 2007/0180983 | A1 * | 8/2007 | Farinella et al. | 89/36.07 |
| 2009/0294595 | A1 | 12/2009 | Pellegrino et al. | |
| 2010/0102166 | A1 | 4/2010 | Konstantinovskiy | |
| 2010/0294122 | A1 * | 11/2010 | Hoadley et al. | 89/36.02 |
| 2011/0174922 | A1 * | 7/2011 | Berman et al. | 244/1 TD |
| 2012/0018571 | A1 * | 1/2012 | Goelet | 244/30 |
| 2012/0211595 | A1 * | 8/2012 | Johnson et al. | 244/3.22 |

* cited by examiner

*Primary Examiner* — Joshua Freeman
(74) *Attorney, Agent, or Firm* — Howard IP Law Group, PC (57) ABSTRACT

A barrier for providing defense against attack from airborne cruise missiles includes a buoyant lighter than air structure. A curtain is suspended from structure and depends from the structure to a level approximately even with the surface. The barrier is deployed across a path identified as a potential attack path for an incoming threat. An incoming missile strikes the curtain which is adapted such that at least a portion of the curtain separates from the barrier and envelopes or entangles the incoming missile. The portion of the curtain covers the flight control planes of the missile and deprives the missile of lift. The missile falls to the surface short of its intended target. The intended target may be a ship which may deploy the barrier at a selected distance from the ship along a determined path of attack.

15 Claims, 5 Drawing Sheets

ANTI-SHIP CRUISE MISSILE BARRIER

FIELD OF THE INVENTION

This disclosure relates to defense against attacks by airborne objects, particularly, attacks by cruise missiles launched against surface ships.

BACKGROUND OF THE INVENTION

Vessels such as surface ships face a tangible threat of attack from anti-ship cruise missiles (ASCMs). ASCMs are designed to fly at low altitudes and may reach air velocities of 0.8 Mach to over 2.0 Mach. In addition, ASCMs may employ countermeasures including radical maneuvers in order to confuse and elude conventional defense systems.

Conventional defense systems include active (or hard kill) defense systems, and passive (or soft kill) defense systems. Hard kill techniques employ a counter weapon, such as an anti-missile missile, or radar guided guns. Hard kill systems are expensive and require detection, analysis and interception of the incoming ASCM through sensors and guidance systems, all of which add to the overall cost of the system. The weapons used in hard kill systems often have greater value than the targets they are intended to destroy. Soft kill techniques include systems for jamming or confusing the flight control systems of the incoming ASCM and attempt to fool the ASCM into striking a dummy target, which the ASCM mistakes for its intended target. However, the immediate effectiveness of a deployed soft kill countermeasure cannot always be determined in a timely manner. While both hard kill and soft kill systems enjoy some degree of success, an alternative defense system against incoming threats posed by ASCMs that addresses the disadvantages of conventional hard and soft kill countermeasures is desired.

SUMMARY

A barrier for providing defense against attack from airborne cruise missiles includes a buoyant lighter than air structure. The buoyant structure is deployed to float at an altitude greater than the surface upon which the intended target is located. A curtain is suspended from the lighter than air structure and hangs from the lighter than air structure and is configured to cover a given area whose boundaries extend proximal to the surface on which the target is located. The curtain is deployed across a path identified as a potential attack path for an incoming threat.

The curtain is configured to separate from the lighter than air structure in whole or in part when the curtain is impacted by an incoming cruise missile. The curtain may have perforations adapted to allow a portion of the curtain to separate from the remaining portions of the curtain when the curtain is struck by the incoming missile.

The separated portion of the curtain is sufficiently large to enwrap and/or entangle the missile, including covering the flight control surfaces of the cruise missile. Covering the flight control surfaces deprives the missile of lift, preventing relative air movement over the flight control surfaces. When deprived of lift, the missile falls due to the force of gravity and strikes the surface before the missile is able to reach the intended target. In one embodiment, the curtain is configured of a durable and resilient material sufficient to withstand impact of the missile without rupture (i.e. through rupture of the material) at the location of impact. Instead, the perforated portions proximal the location of impact cause a segment of the curtain impacted by the missile to be detached therefrom and thereby entangle or enwrap the missile.

BRIEF DESCRIPTION OF THE DRAWINGS

A better understanding of the subject matter in this disclosure may be had considering the written description in combination with the accompanying drawings in which.

DETAILED DESCRIPTION

The following description is provided by way of non-limiting example only. Therefore, the descriptions herein are not intended to be limiting. The invention described herein is limited in scope only by the set of accompanying set of claims. One of skill in the art will recognize other combinations or substitutions for the elements described herein which are considered to be within the scope of this description.

Figure 1:
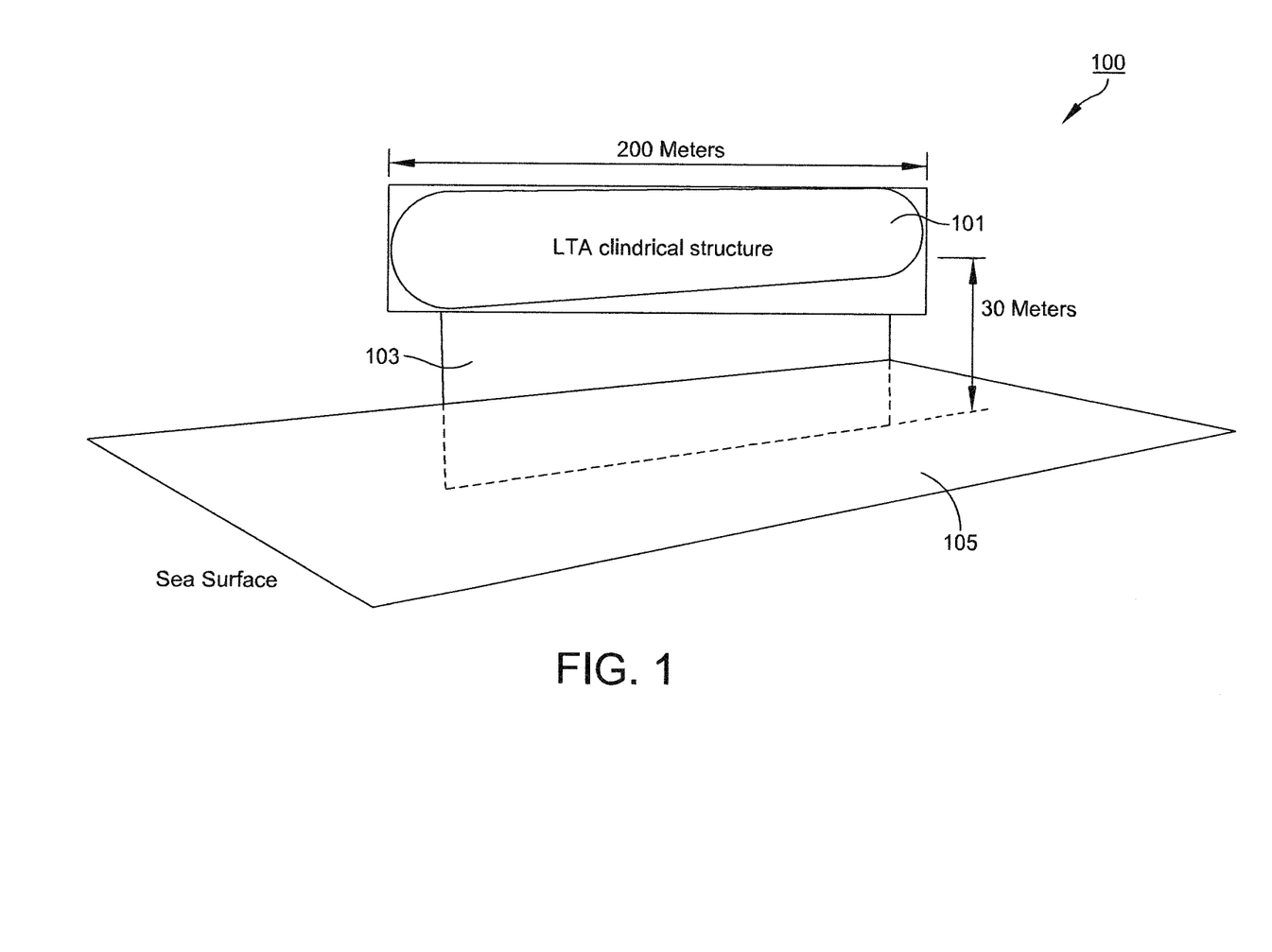
FIG. 1 is a perspective view of an anti-ship cruise missile barrier according to an embodiment of the disclosure.

FIG. 1 shows an embodiment of an ASCM barrier 100 which may be employed to protect a ship or group of ships from attack by ASCM(s) by denying the ASCM access to its intended flight path. The barrier 100 comprises a lighter than air (LTA) structure 101 which is filled with a gas having a vapor density that is less than that of air (e.g. less than 1.0). By way of example, helium (He) may be used to fill the LTA structure 101. According to an exemplary embodiment, the structure 101 may comprise a balloon-like inflatable bladder having a cylindrical profile with rounded ends. The LTA structure 101 when filled with the LTA gas, may be designed to be neutrally buoyant in relation to the overall weight of the curtain or barrier 100 so that the structure maintains a stable elevation. In another embodiment, the LTA structure may be positively buoyant so that the LTA structure tends to increase in elevation. In this embodiment, the LTA structure 101 may be tethered or anchored to maintain a stable elevation for the structure. According to an embodiment of the barrier 100, the LTA structure 101 is an elongated cylinder having a length defined along its longitudinal axis. In one non-limiting embodiment, the length is about 200 meters. The distance between the bottom edge of the curtain 103 and the LTA structure 101 (i.e. height) may be about 30 meters. By way of non-limiting example, a LTA structure 101 may be comprised of MYLAR® or a similar polyester film and configured so that it is capable of containing a lighter than air gas.

A curtain 103 is attached to the LTA structure 101 and hangs, depends or suspends vertically from the LTA structure 101. The curtain 103 hangs down from the LTA structure 101 so that the bottom of the curtain is at an altitude above the surface of a body of water 105 in which the ship(s) are operating. The curtain 103 provides a kinetic barrier sufficient to absorb a portion of the impact from an ASCM striking the curtain. When the curtain 103 is impacted by an incoming ASCM, some or all of the curtain 103 is adapted to separate from the LTA structure 101 and at least partially envelope the ASCM. The curtain 103 or portion of the curtain envelopes the ASCM, which reduces or eliminates lift of the ASCM by preventing airflow over the airfoil control surfaces of the ASCM. The lack of lift causes the ASCM to track downward due to the force of gravity, and eventually may cause the ASCM to strike the water surface 105 before the ASCM has the opportunity to reach its intended destination.

The curtain 103 may be attached to the LTA structure 101 by a quick release fastener. This allows for convenient replacement of some or all of the curtain 103. By way of non-limiting example, the curtain 103 may be attached to the LTA structure 101 with a toothed fastener (e.g. a zipper) or a hook and loop type fastener. Alternatively, other forms of quick release fasteners may be used.

When operating within a relatively fixed area, the ship(s) may identify one or more likely paths of attack from an incoming ASCM based on the location of the ship and surrounding landmarks. The barrier 100 may be deployed over the water 105 at some distance from the ship such that the curtain is normal to the identified path of attack, thereby providing the ship with a defense to the ASCM along the identified path. Operationally, an ASCM following the identified path will strike the barrier 100, become entangled in some or all of the curtain 103, and drop to the water surface 105 before the ASCM is able to reach the ship.

Figure 2:
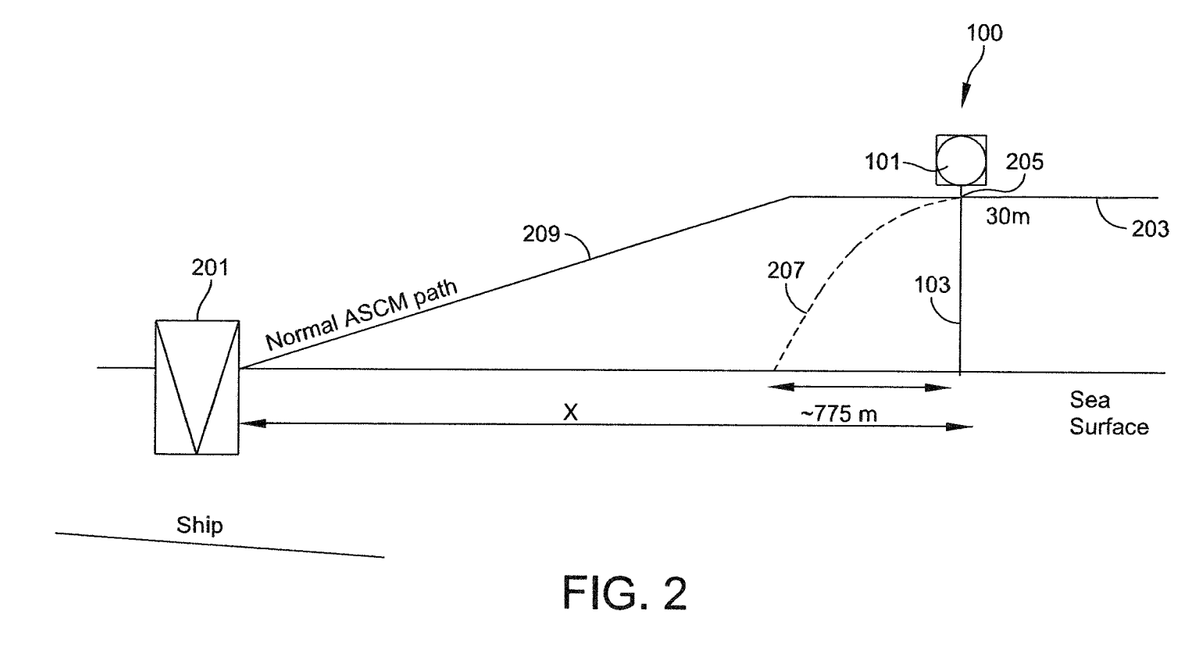
FIG. 2 is an elevation view of an anti-ship cruise missile path according to an embodiment of the disclosure.

Referring now to FIG. 2, an elevation view of the expected flight path 203 and 209 of an incoming ASCM as it is altered by a barrier 100 according to the disclosure is shown. Barrier 100 is deployed at a distance X from a ship 201 of approximately 2.3 kilometers. Expected flight path 203 and 209 represents a normal flight path that may be programmed for an incoming ASCM intended for ship 201. Under the normal flight path, the ASCM approaches on a low altitude path 203 in the direction of ship 201 and then descends along path 209 to the ship. En route to its intended destination, the ASCM encounters barrier 100 comprising LTA structure 101 from which curtain 103 is suspended. The ASCM impacts curtain 103 at point 205 where the force of the impact causes some or all of curtain 103 to detach from the LTA structure 101 and encapsulate and/or entangle the ASCM. The detached portion of curtain 103, stops airflow from reaching the flight control planes of the ASCM causing a loss of lift. Without lift, the ASCM begins to track towards the water surface along a parabolic trajectory path 207 due to gravity, without reaching the intended target, ship 201. According to the embodiment shown in FIG. 2, the ASCM strikes the water's surface about 775 meters from the point of impact 205 with curtain 103. Because the barrier 100 is deployed at approximately 2,300 meters from ship 201, the ASCM falls and strikes the water at a distance from the ship 201 which does not pose a threat to the ship 201.

Figure 3:
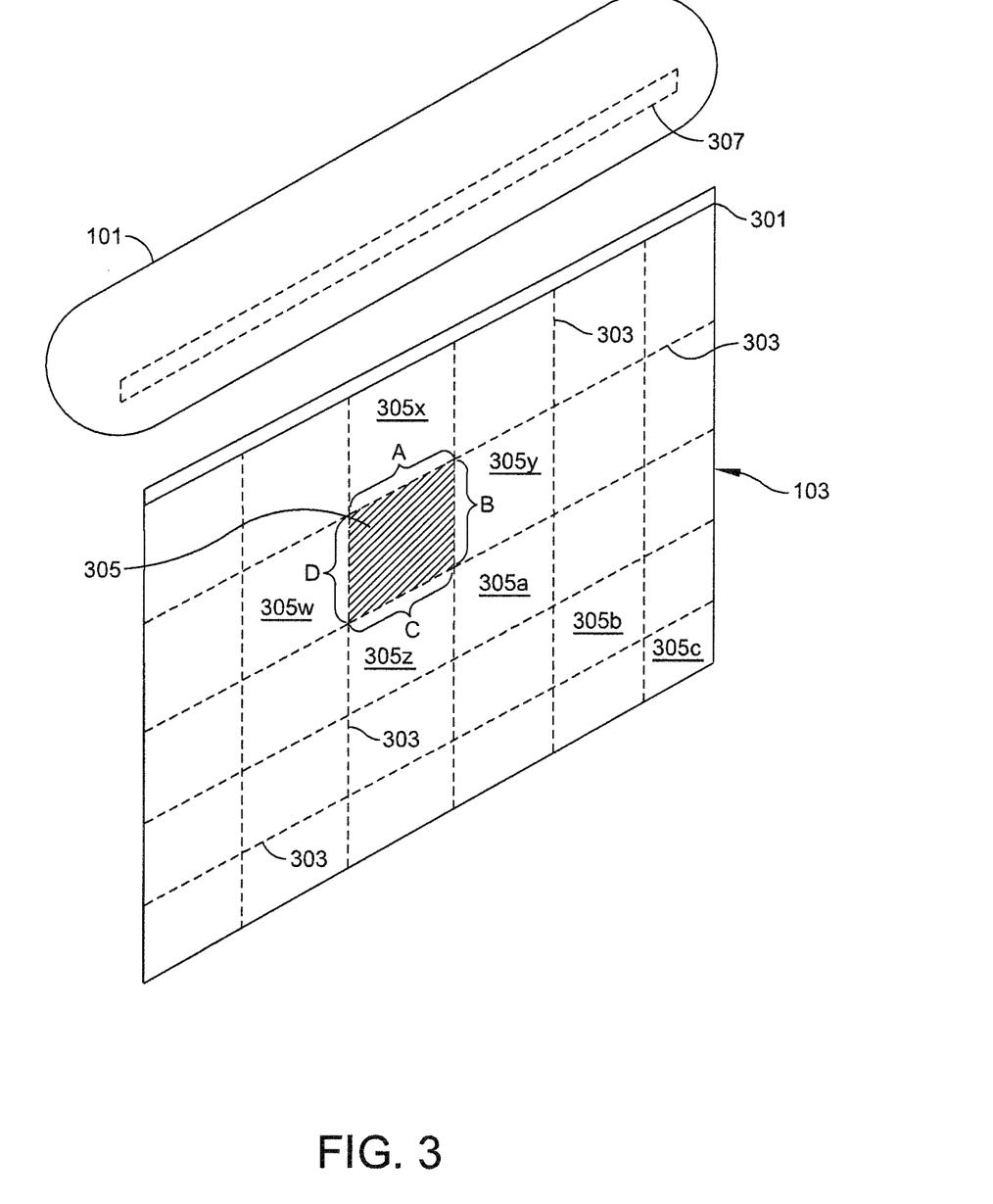
FIG. 3 is a perspective exploded view of an anti-ship cruise missile barrier.

FIG. 3 shows a partially exploded view of a barrier 100 according to an embodiment of the disclosure. An LTA structure 101 is provided which when filled with a gas having a vapor density less than 1.0, (i.e. lighter than air), provides lift sufficient to lift the LTA structure 101 itself, as well the weight of curtain 103. As noted above, the lighter than air gas may provide lift which is sufficient to make the LTA structure 101 along with the curtain 103, neutrally buoyant, and in an example the barrier 100 is neutrally buoyant at a height of about 30 meters above the water surface. As also noted above, in another embodiment a sufficient amount of lighter than air gas is provided to create excess lift. In this embodiment, the LTA structure 101 may be tethered or anchored to secure the barrier 100 in its desired position.

Curtain 103 is adapted to attach to LTA structure 101 and suspend from the LTA structure 10. In an embodiment the LTA structure and the bottom of the curtain are substantially parallel to the water's surface, and the bottom of the curtain is positioned at a sufficient distance above the water to keep it from getting wet and possibly affecting the weight of the curtain. The curtain may also be fabricated of a non-absorbent material. The curtain 103 may be attached to the LTA structure 101 by a reinforced tab 301 hemmed into the material of curtain 103. The tab 301 of the curtain 103 may then attached to a corresponding tab 307 which is secured to the LTA structure 101. The reinforced tabs 301, 307 may be secured to each other through a fixed means, for example, sewn together. Alternatively, reinforced tabs 301, 307 may be secured to each other using a removable securing means, such as a toothed fastener, hook and loop fastener, or the like. In this manner, curtain 103 may be attached to and/or detached from LTA structure 101 in the field. Additionally, the use of a removable fastening means allows for replacement of the curtain 103 in the event a curtain 103 is impacted by an ASCM and needs to be replaced to restore the structural integrity of the curtain 103.

The curtain 103 is configured such that the curtain 103 or a portion 305 of the curtain 103 is released or detaches from LTA structure 101 upon being impacted by an incoming ASCM. Reinforced tab 301 may be configured to be frangible, such that when the curtain 103 is impacted, the curtain 103 tears away from tab 307 on the LTA structure 101. The separated curtain 103 wraps around the moving ASCM, covering the control planes of the missile, thereby depriving the missile of lift and causes the missile to fall due the force of gravity. The curtain 103, or portion 305 of curtain 103, may have a dimension wide or tall enough to at least cover the expected wingspan of an incoming ASCM. The dimensions of curtain 103 or portion 305 of curtain 103 may be adapted to be wider than the expected wingspan of an incoming ASCM, thereby allowing for an off-center strike to nevertheless entangle the incoming ASCM.

In an embodiment, lines of weakness or perforations 303 may be provided in the curtain 103 so that in the event the curtain 103 is impacted at a location within the perforated area 305 defined by the perforated line segments A, B, C, D, only that portion 305 of the curtain is separated and wraps around the incoming ASCM. In this embodiment, the remaining portions of the curtain 103 (e.g. adjacent segments 305$w$, 305$x$, 305$y$, 305$z$) continue to suspend from LTA structure 101 substantially intact. In this way, defense from multiple incoming ASCMs may be achieved, wherein each incoming missile is thwarted by a different portion 305 of curtain 103. The relative strength associated with the lines of weakness, relative to the overall weight of the structure and the absorptive energy required, must be taken into account in the design of the barrier, as is understood by one of ordinary skill in the art. Of course, the above assumes that each perforated segment (305$a$, 305$b$, 305$c$, 305$x$, 305$y$, 305$z$, etc.) defined by the perforated grid shown in FIG. 3 comprises an area sufficiently larger than the span of the impacting ASCM, and comprised of one or more high energy absorbing materials of sufficient elasticity and tensile strength so as to allow the force at the location of the impacting ASCM to be sufficiently absorbed and/or translated over the area defined by the segment such that the ASCM projectile does not merely puncture the material at the point of impact. Instead, the strain resulting from the impact on the segmented material causes the particular segment to detach at its perforated edges, thereby enabling the material initially impacted by the ASCM to remain in contact engagement with the projectile, while the remainder of the continuous segment of material extending from the point of impact (now separated from the grid) surrounds and envelops the ASCM responsively to the ASCM's continued motion. It is noted that ASCM impact at a position along a line of perforation may result in detachment along that line and thus allow ASCM penetration through the curtain without the detached segment enveloping or surrounding the ASCM as described above. In an embodiment, the curtain of FIG. 3 may be formed of multiple stacked layers of perforated material whose perforated segments are offset from each other (i.e. stacked layer) and define multiple, overlapping (in thickness) perforated areas of different sizes. In this manner, multiple stacked perforated layers can accommodate different ASCM impact locations to thereby mitigate the potential for ASCM impact along or proximal a single perforated line.

Curtain 103 should be made of a material (or materials, composites, and the like) of a sufficient density and strength to resist penetration by the ASCM, but which is sufficiently elastic and flexible enough to entangle the incoming ASCM upon impact. In an embodiment, the curtain 103 may be made from a material having a density of approximately 5.0 pounds per square yard, which should have sufficient density and strength to resist penetration by the ASCM. The curtain 103 may be manufactured in the form of a film having a thickness providing the desired density. By way of non-limiting example, a curtain 103 may be comprised of MYLAR® or a similar polyester film. The curtain may be sufficiently strong to resist ASCM penetration, and in one non-limiting embodiment is simply hanging without any side or bottom support members. The relative weight of the structure may be significant and sufficiently large (e.g. 36,000 pounds) wherein the weight of the curtain contributes support to the portion that is impacted.

The LTA structure 101 may be selected to have a density of approximately 0.5 pounds per square yard. In an exemplary embodiment of a barrier 100 having a width of about 200 meters and a height of about 20 meters the following will hold true: Assuming an LTA structure 101 having a cylindrical shape and a cross sectional diameter of about 0.75 meters, the LTA structure 101 will require about 565 square yards of material. With a material density of 0.5 pounds per square yard, the LTA structure 101 will weigh about 282.5 pounds. A corresponding curtain 103 comprising 7,296 square yards of material at 5.0 pounds per square yard weighs 36,480 pounds. Filling the LTA structure with a lighter than air gas such as Helium provides about 3,210 cubic feet of gas. Helium providing (−16.0) pounds of lift per cubic foot, the total gas volume provides 49,920 pounds of lift. This provides a 26% surplus in lift after accounting for the weight of the LTA structure 101 and the curtain 103.

Figure 4:
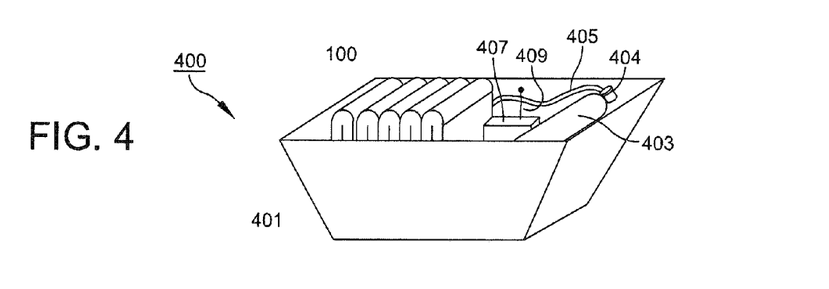
FIG. 4 is a perspective view of a deployment system for an anti-ship cruise missile barrier according to an embodiment of the disclosure.

FIG. 4 shows a deployment package 400 for use in deployment of a barrier for defense against ASCMs. To deploy the barrier 100 of FIGS. 1 and 3, the barrier 100 is dispatched from the ship that is to be protected and inflated at some distance from the ship. In an example, the barrier 100 may be deployed at a distance of about 2.3 kilometers from the ship. The deployment package 400 may be transported from the ship to the desired deployment location by a small craft. In another embodiment, the deployment package 400 may be adapted to have its own means of propulsion and navigation.

The deployment package 400 includes a floating structure 401 which is buoyant and may be configured for stability in all water conditions. The housing 401 contains a source of pressurized lighter than air gas 403, which source may be a pressurized cylinder with a controllable valve 404 that allows the lighter than air gas to flow from the cylinder. The controllable valve 404 may be a manually actuated valve, or may be any other type of remotely controllable valve, such as a electro-mechanical valve. The controllable valve 404 is coupled to a fill line 405 which is also coupled to the LTA structure of the barrier 100. When the controllable valve 404 is opened, pressurized gas 403 flows through fill line 405 into the LTA structure 101 which begins to inflate.

The barrier 100 including the LTA structure 101 and the curtain 103 may be stowed in the housing 401 in a manner which conserves space but allows for the unattended deployment of the barrier 100. For example, the LTA structure 101 and attached curtain 103 may be folded in an accordion fold arrangement. This allows the LTA structure 101 and curtain 103 to unfold and lift out of the housing 401 as the flowing lighter than air gas inflates the LTA structure 101. Fill line 405 may include a check valve and/or a quick release (not shown) which allows the fill line 405 to be detached from the barrier 100 when the LTA structure 101 is filled to its desired level. As will be understood, fill line 405 should be long enough to maintain the connection with the LTA structure 101 as it fills. In an embodiment, the LTA structure may be tethered to the housing 401 so that it lifts a designed maximum distance above the housing during inflation. In this embodiment, the fill line need only be long enough to accommodate the designed maximum distance to maintain the connection with the LTA structure, and after complete inflation of the LTA structure 101 the fill line may be disconnected and then the LTA structure untethered so it reaches its intended elevation. Appropriate fittings may be used that allow remote disconnection of the fill line and remote untethering of the LTA structure.

Control of the deployment process may be performed by a controller 407. The controller 407 may be a special purpose computer including a suitable processor and memory which is configured to store and execute software instructions that are adapted to control the inflation and deployment of the barrier 100 from the deployment package 400. The control process may be performed in hardware, software or a combination of hardware and software. For example, the control function may be performed by an application specific integrated circuit (ASIC) which includes a microprocessor and hard-coded instructions for performing the control process. In another embodiment, the control process may be performed by a general purpose processor in communication with a memory containing software instructions. The general purpose processor executes machine readable instructions from the memory and is further in communication with peripheral system through a communications bus and appropriate input/output ports. For example, in an embodiment the processor may execute instructions for navigating a deployment package 400 that has its own controllable means of propulsion. Further, the processor may execute instructions for inflating the barrier 100 which causes the processor to generate and transmit a signal to actuate the controllable valve 404, which then causes the release of pressurized gas from container 403 via fill line 405. Communication to and from the processor may be carried out through either a wired or wireless connection. A wireless connection transmits signals to and from the controller 407 by way of an antenna 409. In this way, the deployment package 400 may be remotely controlled from the host ship without the need for dedicating personnel resources to the deployment of the barrier 100.

Figure 5A:
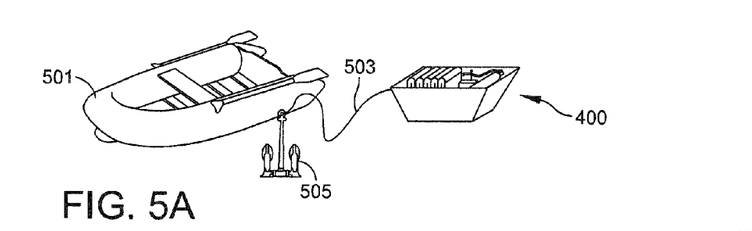
FIG. 5A and FIG. 5B illustrate deployment of an anti-ship cruise missile barrier according to an embodiment of the disclosure showing the barrier in an undeployed state and a deployed state, respectively.
Figure 5B:
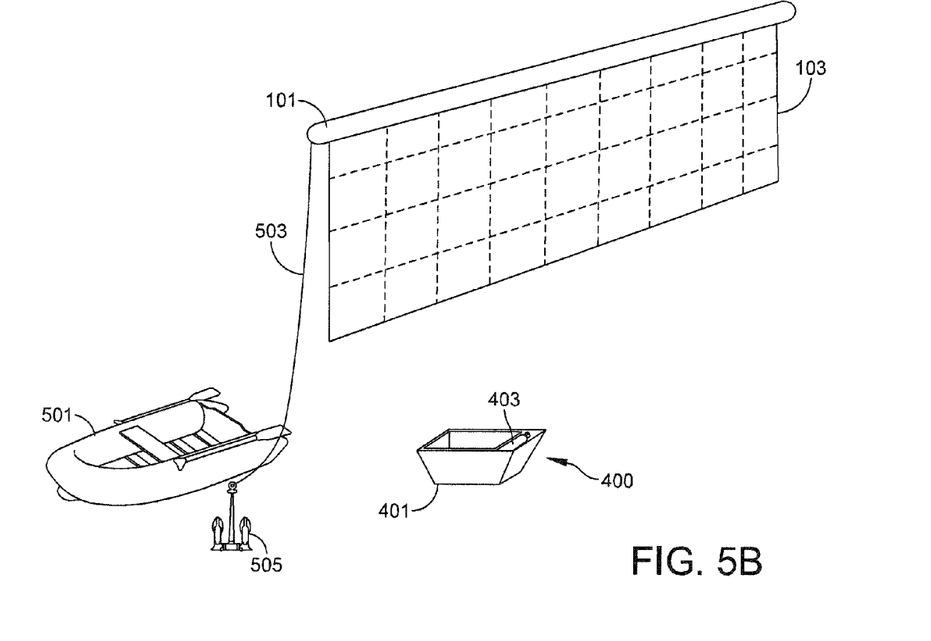

Referring now to FIG. 5A and FIG. 5B, the deployment process of a barrier 100 will now be described. In an embodiment, the barrier 100 may be towed from the host ship (not shown) to the deployment location by a small craft 501. A deployment package 400 as described hereinabove in FIG. 4 may be attached to a tow line 503 connected to the towing craft 501. The tow line 503 may be attached to an anchor 505 which may be released from the tow craft 501 after the barrier 100 is deployed. Tow line 503 may include cabling for carrying communication signals between the tow craft 501 and the deployment package 400. In this embodiment, control signals may be transmitted from the tow craft 501 via the tow line 503 to the controller 407 on the deployment package 400 to control the inflation and deployment of the barrier 100 from the deployment package 400. In another embodiment, the control function of the deployment package 400 may be self-contained, in which case the tow line 503 is configured only for towing the deployment package 400 to a desired location for deployment. The tow line 503 may further serve as an anchor or tethering cable. When deployed, a release mechanism (not shown) on the towing craft 501 may allow an anchor 505 to be dropped so that the barrier 100 will remain in place without the need for tending by a crew. Once deployed, the barrier may remain in place for a period of days or weeks as needed. When the barrier 100 is no longer needed, the barrier may be retrieved to avoid the environmental impact associated with abandonment of the barrier. However, if abandonment of the barrier becomes necessary, the barrier may be configured with a means for scuttling the barrier. For example, the LTA structure 101 may be deflated through a valve in the fill line, or may be punctured or sliced to release the lighter than air gas in the LTA structure. Weights may be placed on or about the barrier to carry the scuttled barrier to the ocean floor to reduce its environmental impact.

FIG. 5B shows the barrier 100 after the LTA structure 101 has been inflated and the curtain 103 is suspended from the LTA structure 101 over the water's surface. Tow line 503 is attached to the tow craft 501 and anchor 505. At this point in the deployment, the towing craft 501 may be stationed to tend the barrier 100, or the anchor 505 may be dropped and the towing craft 501 may return to the host ship. According to another embodiment, the deployment package 400 may be equipped with its own propulsion means that may be remotely controlled. In this embodiment, the deployment package 400 may include anchor 505. The deployment package 400 may be launched from the host ship and navigation of the deployment package 400 may be performed through wireless communications with the deployment package 400. Alternatively, the navigation coordinates may be pre-programmed into a navigation system in the deployment package controller so that deployment package self-navigates to the deployment position without external control. Once the deployment package 400 reaches its intended destination, a deployment process as described above with regard to FIG. 4 may be performed.

Figure 6A:
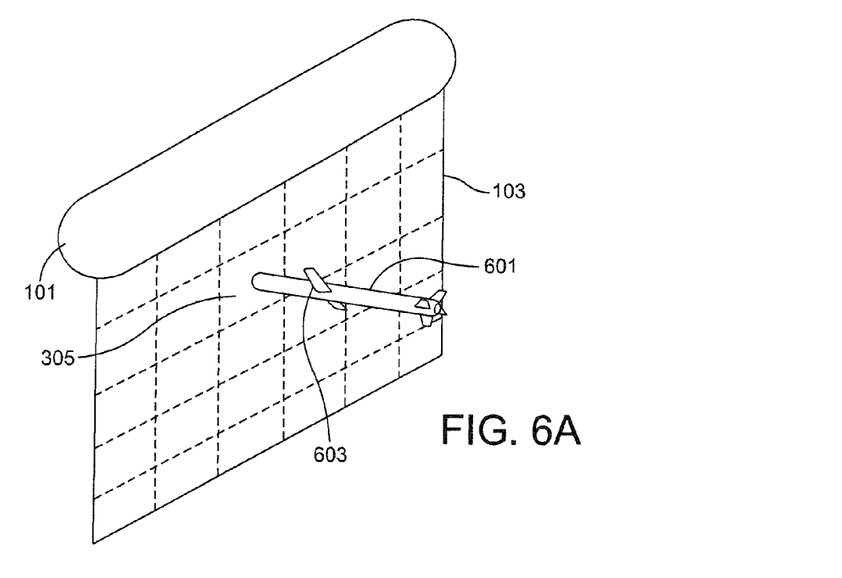
FIG. 6A and FIG. 6B show an anti-ship cruise missile prior to contact with a barrier and after contact with the barrier according to an embodiment of the disclosure.
Figure 6B:
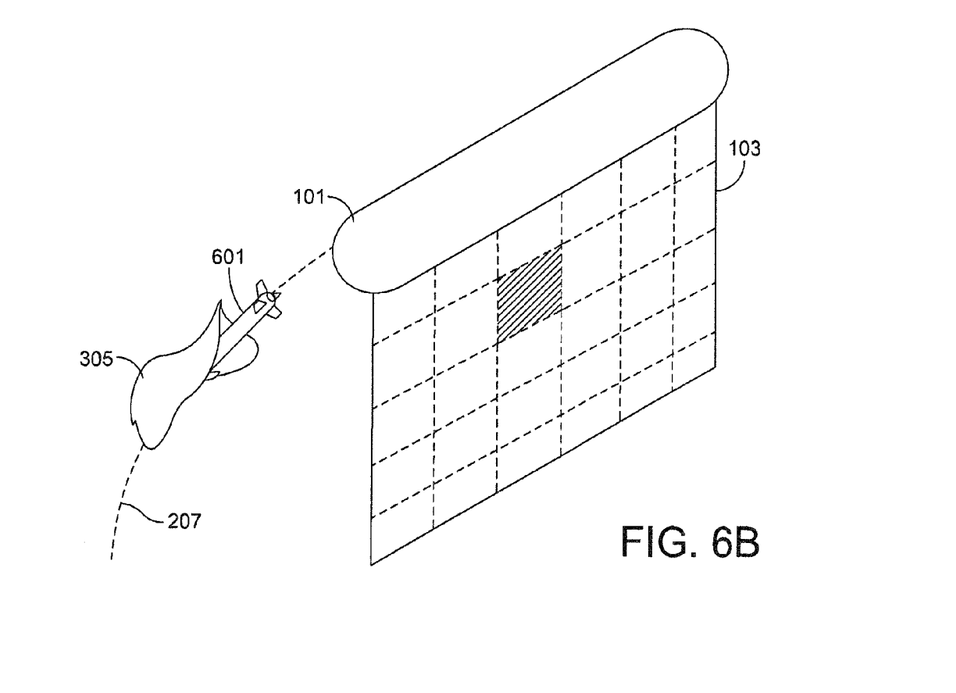

FIG. 6A and FIG. 6B show the operation of a barrier 100 against an incoming ASCM. An incoming ASCM 601 is travelling at a low altitude and has a bearing toward a host ship (not shown) which is being protected by the barrier 100. The ASCM 601 may be travelling along a path that was identified by the host ship as a likely path of attack by the host ship and along which a barrier 100 was deployed. The barrier 100 includes an LTA structure 101 from which curtain 103 is suspended between the LTA structure 101 and the water's surface. The curtain 103 may be perforated 303 which allows for a portion of the curtain 103 to tear away when the portion is impacted by an incoming ASCM 601. The ASCM 601 includes control planes 603 which provide flight control for the ASCM 601. The control planes 603 may be configured as an adjustable airfoil which provides lift to the ASCM 601 as relative air flow travels around the control planes 603 due to the thrust of the ASCM 601 in its direction of travel.

Barrier 100 is deployed across the incoming path of the ASCM 601 causing the ASCM 601 to strike the surface of curtain 103 at a location defined by portion 305 of the curtain 103. A perimeter defined by perforated lines 303 allows the portion 305 to be separated from the remainder of the curtain 103 upon ASCM 601 impacting the curtain as shown in FIG. 6B. As portion 305 of curtain 103 separates from the remaining curtain 103, the removed portion 305 wraps around and entangles ASCM 601 as shown in FIG. 6B. The portion 305 of curtain 103 has a dimension large enough to wrap around the ASCM 601 including control planes 603. When covered by portion 305 of curtain 103, relative airflow over control planes 603 is prevented, and the ASCM is deprived of lift normally provided by the unfettered control planes 603. Without lift, ASCM 601 tracks toward the water's surface due to the force of gravity exerted on the ASCM 601. ASCM 601 proceeds to fall along parabolic path 207 and strikes the water's surface short of its intended target.

Thus, a barrier (100) configured to obstruct an incoming cruise missile (601), comprises an airborne structure (101) configured to be buoyant at a selected altitude above a surface (105) on which a target is situated; and a curtain (103) attached to the neutrally buoyant structure (101), the curtain being configured to hang downward or suspend from the neutrally buoyant structure (101) and towards the surface (105); wherein the neutrally buoyant structure (101) is placed along a strike path to the intended target, thereby placing the curtain in a position to be impacted by the incoming cruise missile. The intended target may be a surface ship on patrol or in port.

The buoyant airborne structure (101) may be configured to be neutrally buoyant at an altitude of about 35 to 50 meters above the surface. In one configuration, the buoyant airborne structure comprises an inflatable cylindrical structure. In one configuration, the curtain (103) is adapted to detach from the buoyant airborne structure and envelope the control plane surfaces of the incoming cruise missile when it is impacted by the incoming cruise missile, thereby reducing lift at the control plane surface (603) and causing the cruise missile (601) to track towards the surface (105). The barrier or curtain (103) may be perforated in a pre-selected pattern (303), such that a portion (305) of the curtain (103) is configured to separate from the remainder of the curtain (103) when the portion (305) is impacted by an incoming cruise missile. In one configuration, the curtain comprises a material having a density of about 5.0 pounds per square yard. In one configuration, the buoyant airborne structure (101) comprises a material having a density of about 0.5 pounds per square yard.

In one configuration, the buoyant airborne structure (101) further comprises a first tab and the curtain (103) further comprises a second tab (301), with a fastener disposed between the first tab and the second tab and configured for selectively coupling and decoupling the curtain (103) from the buoyant airborne structure (101). The fastener may be a toothed fastener or a hook and loop fastener.

In an embodiment of the disclosure, a method of defending an intended target against an attack from a cruise missile (601) comprises the steps of: placing a buoyant airborne structure (101) along a strike path to the intended target (201); attaching a curtain (103) to the neutrally buoyant airborne structure, wherein the curtain (103) is suspended in a downward direction from the buoyant airborne structure (101) towards a surface (105) on which the intended target is situated, thereby placing the curtain in a position to be impacted by the cruise missile. The method may further comprise perforating the curtain in a pattern such that a portion of the curtain separates from the remaining portion of the curtain upon being impacted by an incoming cruise missile. The buoyant structure may be placed at an altitude of about 35 to 50 meters. The buoyant structure may be placed at greater than 2 kilometers away from the intended target. The curtain may be attached to the buoyant structure with a quick release fastener.

In an embodiment of the disclosure, a deployment package for an inflatable cruise missile barrier comprises a floating structure; an inflatable structure defining a volume configured to hold a lighter than air gas; a pressurized vessel containing a lighter than air gas under pressure; a fill line coupled to the pressurized vessel and the inflatable structure; a controllable valve between the pressurized vessel and the fill line configured to allow the gas under pressure to enter the volume of the inflatable structure when the controllable valve is opened; a curtain attached to the inflatable structure and configured to suspend from the inflatable structure; and a controller configured to control the controllable valve and operative to inflate the inflatable structure with the lighter than air gas, thereby causing the inflatable structure to float. The deployment package may further comprise a wireless communications module coupled to the controller for allowing remote control of the deployment package. A propulsion system and a navigation system may be coupled to the controller, the propulsion system configured to propel the deployment package to a location programmed into the navigation system.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A barrier configured to obstruct an incoming cruise missile, comprising:
   a buoyant airborne structure configured to be buoyant at a selected altitude above a surface on which an intended target is situated; and
   a curtain attached to said buoyant airborne structure, said curtain being configured to hang downward from said buoyant airborne structure and towards said surface;
   wherein said curtain is perforated in a pre-defined pattern such that a portion of said curtain is configured to separate from the remainder of said curtain when a location within said portion is impacted by an incoming cruise missile;
   wherein said buoyant airborne structure is positioned along a strike path to said intended target, thereby placing the curtain in a position to be impacted by the incoming cruise missile.

2. The barrier of claim 1, wherein the intended target is a ship, and said surface is water.

3. The barrier of claim 1, wherein said buoyant airborne structure is configured to be neutrally buoyant at an altitude of about 35 to 50 meters above said surface.

4. The barrier of claim 1, wherein said buoyant airborne structure comprises an inflatable cylindrical structure.

5. The barrier of claim 1, wherein said curtain is configured to detach from the buoyant airborne structure and envelope a control plane surface of the incoming cruise missile when it is impacted by the incoming cruise missile, thereby reducing lift at the control plane surface and causing the cruise missile to track towards said surface.

6. The barrier of claim 1, wherein said curtain comprises a plurality of stacked layers of material, and wherein said curtain being perforated in a pre-defined pattern comprises adjacent layers of said plurality of stacked layers of material having offset perforations.

7. The barrier of claim 1, wherein said curtain comprises a material having a density of about 5.0 pounds per square yard.

8. The barrier of claim 1, wherein said buoyant airborne structure comprises a material having a density of about 0.5 pounds per square yard.

9. A barrier configured to obstruct an incoming cruise missile, comprising:
   a buoyant airborne structure having a reinforced tab attached thereto, said buoyant airborne structure configured to be buoyant at a selected altitude above a surface on which an intended target is situated;
   a curtain having a second reinforced tab attached thereto; and
   a fastener for removably securing the buoyant air structure reinforced tab to the curtain second reinforced tab, to thereby selectively couple and decouple the curtain from the buoyant airborne structure;
   wherein when said buoyant airborne structure is positioned at said selected altitude and said curtain is selectively coupled to said buoyant airborne structure, said curtain is configured to hang downward from said buoyant airborne structure and towards said surface;
   wherein said buoyant airborne structure is positioned along a strike path to said intended target, thereby placing the curtain in a position to be impacted by the incoming cruise missile; and
   wherein said curtain second reinforced tab is a frangible tab configured to tear away from said buoyant airborne structure reinforced tab when the curtain is impacted by the incoming cruise missile.

10. The barrier of claim 9, wherein said fastener is a toothed fastener.

11. The barrier of claim 9, wherein said fastener is a hook and loop fastener.

12. The barrier of claim 9, wherein said fastener is a quick release fastener.

13. A deployment package for an inflatable cruise missile barrier comprising:

a water buoyant structure;

an inflatable structure defining a volume configured to hold a lighter than air gas;

a pressurized vessel containing a lighter than air gas under pressure;

a fill line coupled to said pressurized vessel and said inflatable structure;

a controllable valve between said pressurized vessel and said fill line configured to allow said lighter than air gas under pressure to enter the volume of said inflatable structure when said controllable valve is opened;

a curtain attached to said inflatable structure and configured to suspend from said inflatable structure; and a controller configured to control said controllable valve and operative to inflate said inflatable structure with said lighter than air gas, thereby causing said inflatable structure to float in air;

wherein the water buoyant structure houses the inflatable structure, the pressurized vessel, the fill line, the controllable valve, the curtain, and the controller prior to deployment, and wherein the water buoyant structure is positioned along a strike path to the intended target so that the inflatable structure and attached curtain contained in said water buoyant structure is deployed from the water buoyant structure upon inflation by said controller.

14. The deployment package of claim 13, further comprising a wireless communications module coupled to said controller for allowing remote control of said deployment package.

15. The deployment package of claim 13, wherein the water buoyant structure further comprises a propulsion system and a navigation system coupled to the controller, said propulsion system being capable of propelling the deployment package to a location programmed into the navigation system.

* * * * *